United States Patent
Gusev et al.

(10) Patent No.: US 11,665,121 B2
(45) Date of Patent: *May 30, 2023

(54) DETERMINING TOPIC COHESION BETWEEN POSTED AND LINKED CONTENT

(71) Applicant: Pinterest, Inc., San Francisco, CA (US)

(72) Inventors: Andrey Dmitriyevich Gusev, San Francisco, CA (US); Wenke Zhang, Burlingame, CA (US); Hsiao-Ching Chang, San Francisco, CA (US); Qinglong Zeng, San Francisco, CA (US); Peter John Daoud, New York, NY (US); Jun Liu, San Francisco, CA (US); Grace Chin, San Francisco, CA (US); Zhuoyuan Li, Palo Alto, CA (US); Jacob Franklin Hanger, San Francisco, CA (US); Vincent Bannister, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,386

(22) Filed: Jan. 19, 2022

(65) Prior Publication Data
US 2022/0150203 A1     May 12, 2022

Related U.S. Application Data

(63) Continuation of application No. 16/575,813, filed on Sep. 19, 2019, now Pat. No. 11,233,761.

(Continued)

(51) Int. Cl.
    *H04L 51/216*     (2022.01)
    *H04L 51/063*     (2022.01)
    *G06N 20/00*     (2019.01)

(52) U.S. Cl.
    CPC .......... *H04L 51/216* (2022.05); *G06N 20/00* (2019.01); *H04L 51/063* (2013.01)

(58) Field of Classification Search
CPC ...... H04L 51/063; H04L 51/216; G06N 20/00
See application file for complete search history.

(56) References Cited

U.S. PATENT DOCUMENTS

| | | |
|---|---|---|
| 10,616,274 B1 | 4/2020 | Chang et al. |
| 11,233,761 B1 * | 1/2022 | Gusev ................. G06N 3/08 |

(Continued)

*Primary Examiner* — Azizul Choudhury
(74) *Attorney, Agent, or Firm* — Athorus, PLLC

(57) ABSTRACT

Systems and method for determining a topic cohesion measurement between a content item and a hyperlinked landing page are presented. In one embodiment, a plurality of content item signals is generated for the content item and a corresponding plurality of signals are generated for the hyperlinked landing page. An analysis of the corresponding signals is conducted to determine a measurement of topic cohesion, a topic cohesion score, between the content item and the hyperlinked landing page. A cohesion predictor model is trained to generate the predictive topic cohesion score between an input content item and a hyperlinked landing page. Upon a determination that the topic cohesion score is less than a predetermined threshold, remedial actions are taken regarding the hyperlink of the content item. Alternatively, positive actions may be carried out, including promoting the content item to others, associating advertisements with the content item, and the like.

20 Claims, 10 Drawing Sheets

Related U.S. Application Data

(60) Provisional application No. 62/821,876, filed on Mar. 21, 2019.

(56) References Cited

U.S. PATENT DOCUMENTS

| | | | |
|---|---|---|---|
| 2017/0032424 A1 | 2/2017 | Cetintas et al. | |
| 2018/0121953 A1* | 5/2018 | Zhang | G06N 20/00 |
| 2018/0260840 A1* | 9/2018 | Jeon | G06N 20/00 |
| 2018/0268317 A1 | 9/2018 | Dharwadker et al. | |
| 2019/0073592 A1 | 3/2019 | Luo et al. | |
| 2019/0073593 A1 | 3/2019 | Luo et al. | |
| 2019/0102466 A1 | 4/2019 | Wang et al. | |
| 2019/0138591 A1 | 5/2019 | Kesher et al. | |
| 2019/0205918 A1* | 7/2019 | Kim | G06Q 30/0243 |
| 2020/0213271 A1 | 7/2020 | Alekseenko | |
| 2020/0402015 A1 | 12/2020 | Ozcaglar et al. | |

\* cited by examiner

DETERMINING TOPIC COHESION BETWEEN POSTED AND LINKED CONTENT

RELATED MATTERS

This application is a continuation application of and claims the benefit to U.S. patent application Ser. No. 16/575,813, filed on Sep. 19, 2019 and titled "Determining Topic Cohesion Between Posted and Linked Content," which claims the benefit of U.S. Provisional Patent Application No. 62/821,876, filed on Mar. 21, 2019. Both applications are hereby incorporated by reference herein in their entireties.

BACKGROUND

As society increasingly interacts through an online world, it is ever more common that people will discover multi-media content on the Internet that impacts them in one form or another. When this happens, it is also common that these people post or repost the impactful content to an online service where it can be annotated by the posting party, grouped together with other (often similar) items of content, and generally shared with other persons. In many instances, these posted items of content will be associated with a hyperlink to the source location of the content from which the person obtained the content for posting. Issues arise, however, in the fact that the landing page of the posted content, i.e., the hyperlinked web page of the posted content, changes over time. Thus, over time, the posted content is directed to a first topic, while the landing page is directed to another. This change to the landing page can be referred to as "topic drift." The result of topic drift is that a person, in viewing the posted content, and subsequently following the hyperlink to the landing page, can be quite disappointed in viewing a web page that is off-topic to the posted content.

Another, seemingly unrelated issue, is that less-than well-intentioned people will often make use of, or abuse, popular and/or desirable multi-media content by posting the content on the online services and hyperlinking that content to undesirable, sometimes malware-infected landing pages. An unsuspecting party, upon encountering the desirable content, will follow the hyperlink and fall prey to ill intents of the less-than-reputable landing page. For those network-based online services that wish to continue to grow in usage and popularity, ensuring that their users or subscribers enjoy a positive experience often means ensuring that posted content is hyperlinked to relevant or related content, and that these same users are protected from ill-intentioned parties hijack-ing their popular content to carry out ill-intents.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1A:
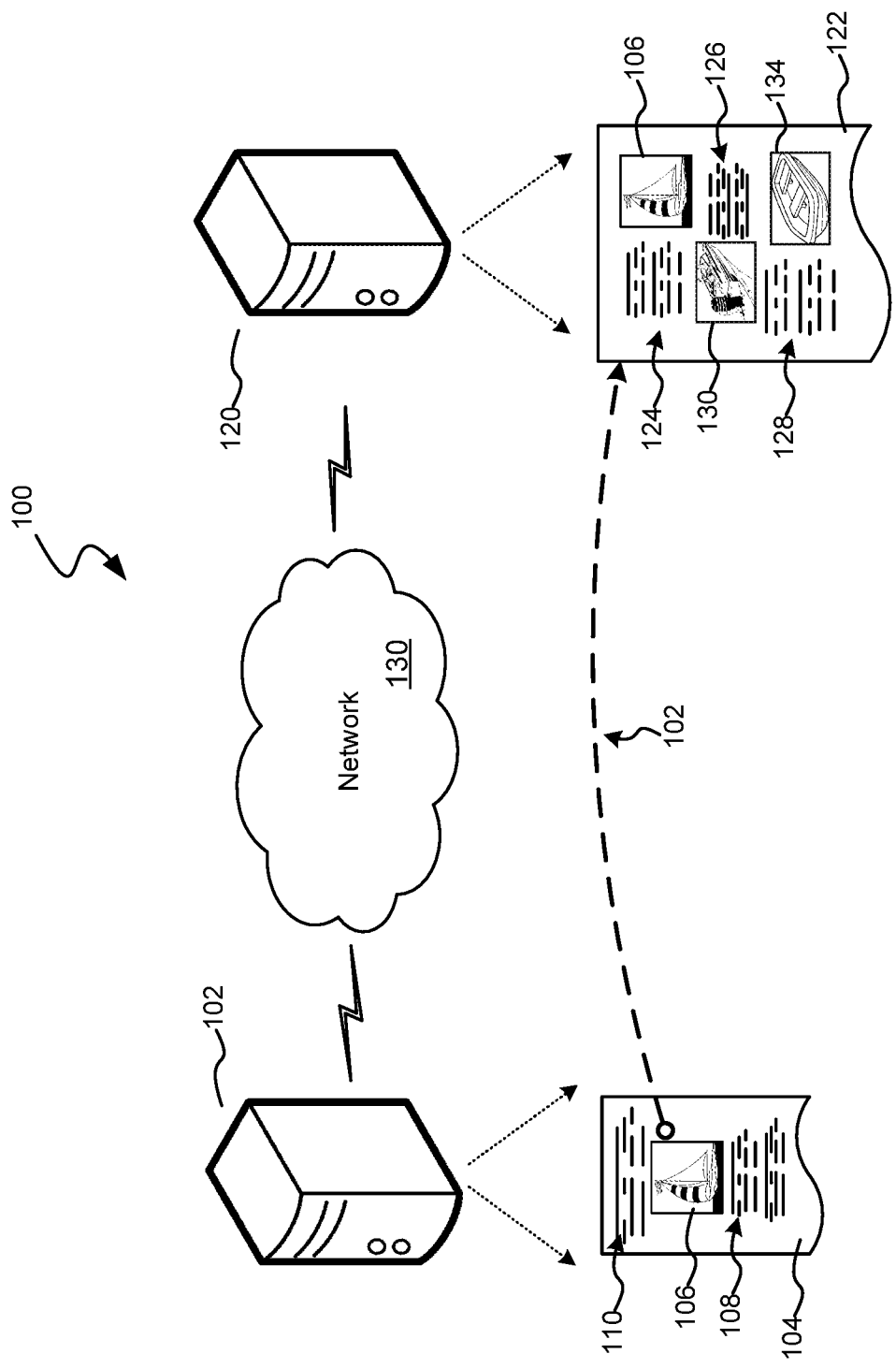
FIGS. 1A and 1B are pictorial diagrams illustrating "topic drift" of a landing page as shown at a first and second time period.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

The term "landing page" refers to a network-accessible document that is suitably configured according to various standards, such as the Internet and World Wide Web, and displayable as a web page in a web browser. A landing page may include any of a collection of content items including, but not limited to, textual content, multi-media content, executable (typically interpretable instructions), and the like. A web browser displays the content of a web page as a document on a display device. While the web page is what is displayed to a person on a display device, for purposes of this document, the term landing page also and primarily refers to the web page document. These documents are usually written in a standard markup language such as HTML or XML. Additionally, the term "content item," as used herein, corresponds to a source item hyperlinked to a landing page, or an item of content within the landing page. A content item may correspond to any number of forms or types, including but not limited to textual content and multimedia content (especially including images, video files, and/or audio files).

According to aspects of the disclosed subject matter, systems and methods for determining a topic cohesion measurement between a content item and a hyperlinked landing page are presented. In one embodiment, a plurality of content item signals is generated for the content item and a corresponding plurality of signals are generated for the hyperlinked landing page. An analysis of the corresponding signals is conducted to determine a measurement of topic cohesion, a topic cohesion score, between the content item and the hyperlinked landing page. Upon a determination that the topic cohesion score is less than a predetermined threshold, remedial actions are taken with regard to the hyperlink of the content item. In another embodiment, a cohesion predictor model (a machine learning model) is trained to generate a predictive topic cohesion score between an input content item and a hyperlinked landing page. If the returned predicted topic cohesion score is less than a predetermined threshold, remedial actions are taken with regard to the hyperlink of the content item.

In contrast to taking remedial action, upon a determination that the topic cohesion score meets or exceeds a predetermined threshold (perhaps a second predetermined threshold that the one used to take remedial action), indicative of a high cohesion between the content item and its landing page, that content item could be advantageously used in promotion to others, or advantageously leveraged, utilized and/or promoted to other persons to increase advertising margins relating to the content item or user interaction. Promoting a content item upon a determination of meeting or exceeding a promotion-related threshold is discussed below in greater detail.

As suggested above, topic drift can often arise when a person posts content linked to a landing page with relevant content yet, subsequently, the overall theme or topic of the landing page changes, leaving the posted content linked to items that are not relevant. For instance, and turning to FIGS. 1A and 1B, these two figures show pictorial diagrams illustrating how "topic drift" occurs between a posted content item linked to a landing page as shown at a first and second time period.

In reference to FIG. 1A, this figure illustrates a network environment 100 that includes a posting service 102 and a hosting site 120 interconnected by a network 130. In this illustration, a user of the posting service 102 has posted an item of content 106 (in this example an image) to the service. Additionally, for this example assume that the item of content 106 was obtained from a web page 122 maintained by the hosting site 120 and is hyperlinked to the web page 122, i.e., the "landing page" for the item of content 106. In addition to the posted item of content 106, assume that the posting user has also titled (e.g., title 110) the posting page 104 in which the posting user has posted the item of content, and has further added descriptive text and captions 108 to the source page. Finally, the posting user has hyperlinked (as illustrated by line 102) the item of content 106 to the landing page 122.

For its part, the landing page 122 includes the posted item of content 106, as well as other, similar and related content items 130, 134. Further still, the landing page 122 includes textual, descriptive content regarding the various images 106, 130, 134. For this example, we can assume that the posting page 104 created by the posting user shares topic cohesion with the landing page 122, meaning that the topical subject matter of both pages is the same, relevant to, and/or related to each other. In the present example, we can assume that the posting page 104 is topically related to boating, and the landing page, too, is topically related to boating. While perhaps not the same topic, there is clearly topic cohesion between the content on posting page 104 and the landing page 122.

Figure 1B:
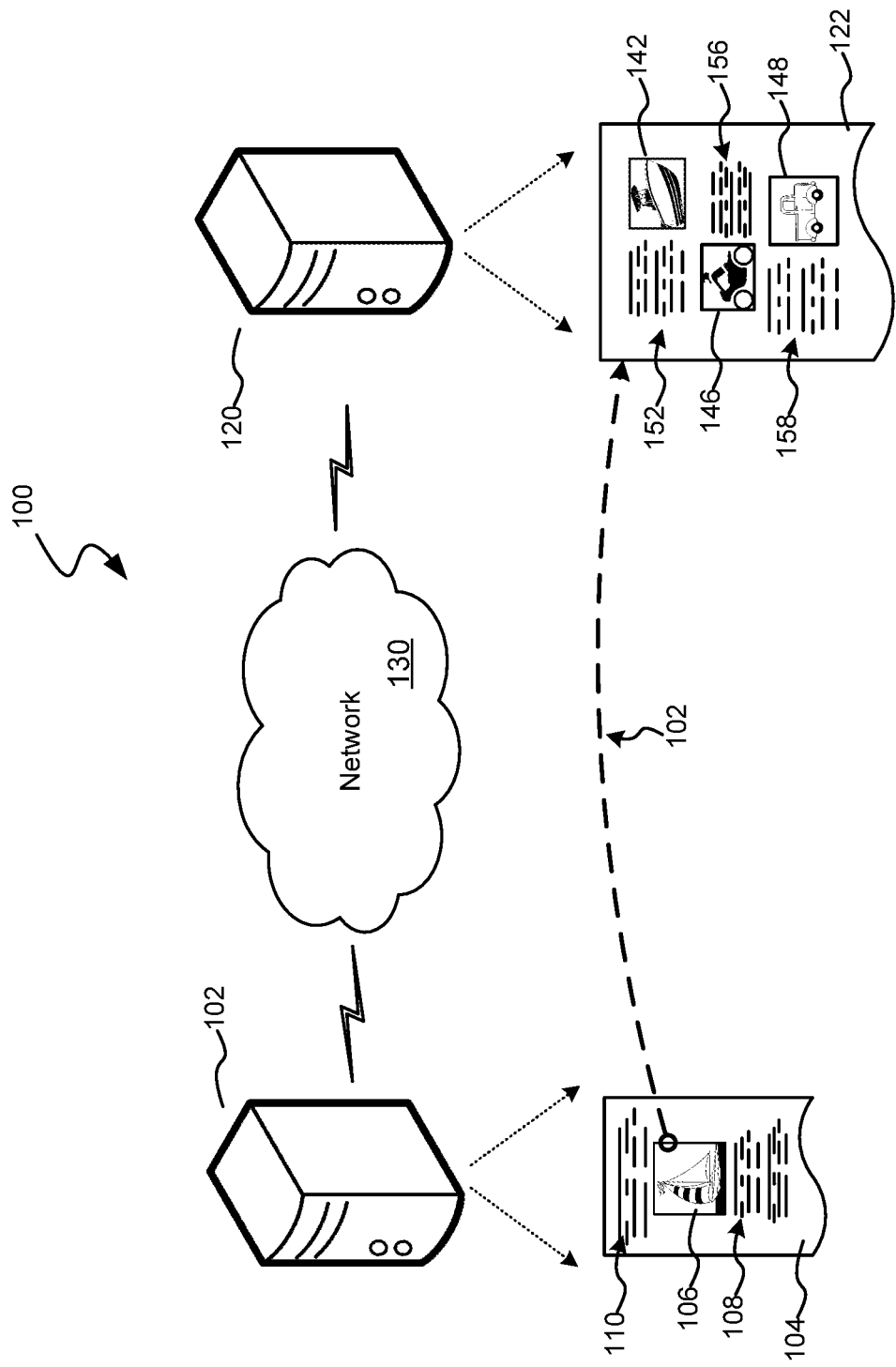

Assuming now that time has passed, FIG. 1B illustrates the same network environment 100 in which the posting page 104 has remained static, and the content item 106 has remained hyperlinked to landing page 122. However, over this period of time, landing page 122 has experienced some changes that can be described as topic drift. As illustrated in FIG. 1B, the landing page 122 now has content 142, 146 and 148 that appears more closely related to motorized transportation. Additionally, we assume that the textual content block 152, 156 and 158 are generally cohesive to the corresponding images 142, 146 and 148 regarding motorized transportation. In short, the topic of landing page 122 has drifted from boating to motorized transportation. However, since content item 106 in posting page 104 has remained hyperlinked to landing page 122, the amount of topic cohesion between the two pages is substantially reduced. As a result, a third party following the hyperlink from content item 106 to landing page 122 would likely experience some confusion, at least as to why the content item was linked to the landing page.

Figure 2:
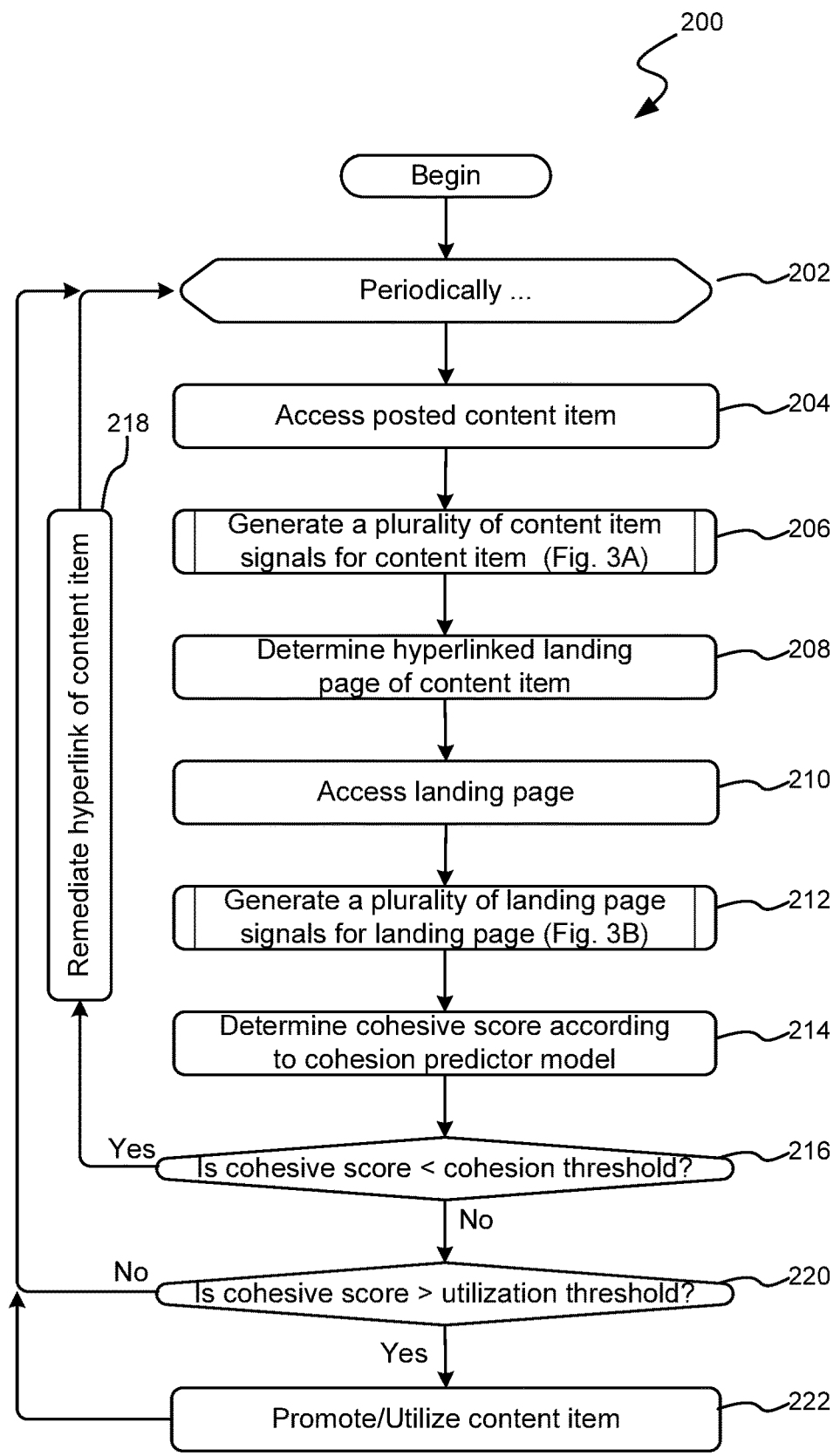
FIG. 2 is a flow diagram illustrating an exemplary routine for determining topic cohesion between a content item that is hyperlinked to a landing page, formed in accordance with aspects of the disclosed subject matter.

To remedy the situation of lack of topic cohesion between a posted content item and a hyperlinked landing page due to topic drift (or deliberate linking of content items to non-related landing pages), on-demand or period checks for topic cohesion can be used. To this end, FIG. 2 is a flow diagram illustrating an exemplary routine 200 for determining topic cohesion between a content item of a posting page that is hyperlinked to a landing page, formed in accordance with aspects of the disclosed subject matter. Beginning at block 202, a periodic looping is begun in which posted content is checked against a hyperlinked landing page to determine whether there is topic cohesion between the two. Thus, after a predetermined amount of time (or, in an on-demand manner), at block 204 the posted content item is accessed. At block 206, content signals are generated for the posted content item, which content signals are used to determine topic cohesion with the subject matter of a hyperlinked landing page. Generating content signals for a content item is set forth in regard to routine 300 of FIG. 3A.

Figure 3A:
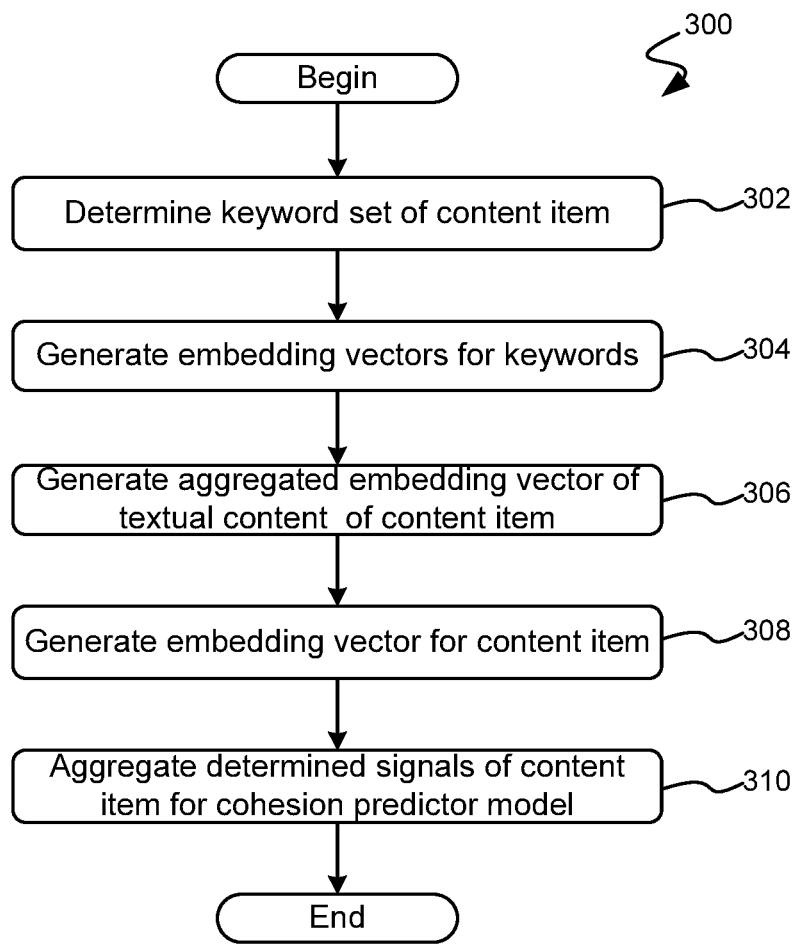
FIGS. 3A and 3B are flow diagrams illustrating exemplary routines for generating content signals of both a content item and a landing page for determining topic cohesion between the content item and the landing page in accordance with aspects of the disclosed subject matter.

Turning to FIG. 3A, this figure is a flow diagram illustrating an exemplary routine 300 suitable for generating content signals for a content item in accordance with aspects of the disclosed subject matter. Beginning at block 302, keywords associated with the content item are identified. According to aspects of the disclosed subject matter, these keywords are taken from an aggregation of textual data sources/content associated with the content item. These sources include, by way of illustration and not limitation, a title of the content item, one or more captions related to the content item, user-supplied comments associated with the content item, a source URL (uniform resource locator) of the content item, and the like.

With reference again to FIG. 1A, the posted page 104 includes several textual content items that include, by way of illustration and not limitation, a title (titular content) 110 of the page upon which the input item/content item 106 is found, caption data 108 of the content item, user comments (from both the posting user and third-party users), the source uniform resource locator (URL) of the content item, the hyperlink (the textual representation or URL) to the landing page, and the like. From this aggregated text content, the keywords of the content item are identified. According to aspects of the disclosed subject matter, this identification is made through an analysis of the aggregated textual content, resulting in the identification of a set of keywords (or key-phrases) for the content item. In one embodiment, a TF/IDF (term frequency/inverse document frequency)

analysis/evaluation is made to identify the keywords and key-phrases of the textual content.

At block 304, embedding vectors are generated for the set of keywords of the content item as determined in block 302. As those skilled in the art will appreciate, an embedding vector (also frequently called a feature vector) is an array of values (each element of the array being called an "embedding value") for a given input item, e.g., the posted keywords. Regarding embedding vectors, each embedding value of the array of values (i.e., the embedding vector) corresponds to a "dimension" of the input item and represents some feature or aspect of that input item. Indeed, an embedding vector is a multi-dimensional representation of an item of content in a vector space of the item's type. For example, a word embedding (i.e., an embedding vector generated from a word or phrase) is a multi-dimensional representation of the word in a text-based vector space. For purposes of this disclosure, the terms "embedding vector" and "embedding" refer to an array of embedding values. To generate an embedding vector, a trained machine learning model (also referred to as a trained neural network) accepts an input item and, through several iterations (called layers) of processing, generates the array of embedding values.

As those skilled in the art will appreciate, a trained machine learning model will generate an embedding vector with the same dimensions, though the embedding value of each dimension will be determined according to the subject matter of the input item. In this manner, embedding vectors in the same embedding vector space can be compared to determine similarity between the two. In a typical embedding vector (though not exclusively), each embedding value/dimension is represented by a 16-bit (or 32-bit) floating point value. Often (though not exclusively) embedding vectors are typically comprised of 128 or more dimensions. Regarding images and other multi-media content files, machine learning models for generating embedding vectors are known in the art, such that either proprietary and/or publicly-accessible embedding vector generators may be used. In regard to generating embedding vectors for the identified keywords, the embedding vectors may be generated by a proprietary, trained machine learning model or, alternatively, may be generated by any one of various publicly available embedding vector generators for text-based content. Examples of these publicly available text-based embedding vector generators include FastText and ConceptNet, as in known in the art.

At block 306, an embedding vector for the aggregated text content (as determined in block 302) is generated. According to some aspects and embodiments of the disclosed subject matter, an aggregated embedding vector of the textual content associated with the content item comprises generating a hierarchical arrangement/organization of the various embedding vectors of the identified keywords. Alternatively and according to further aspects of the disclosed subject matter, this aggregated embedding vector for the text content of the content item is generated as an averaged embedding vector. Averaging embedding vectors comprises determining a mean or average value across each dimension or element of the various identified embedding vectors. For example, the values of the first elements of each embedding vector are averaged, and that averaged or mean value becomes the value of the first element of the resulting averaged embedding vector.

According to these aspects of the disclosed subject matter, averaging the values of the keyword embedding vectors may further include weightings associated with one or more of the embedding vectors. By way of illustration and not limitation, these weightings may reflect the importance and/or frequency of individual keywords, such that the more important, and/or the more frequently-occurring keywords have greater effect in the averaging than those keywords that are less frequent or have less importance to the overall aggregated text.

At block 308, an embedding vector of the content item (e.g., an embedding vector generated for image 106, excluding the textual data associated with the image) is generated. At block 310, the various content signals are aggregated, these content signals including the embedding vector for the content item, the embedding vector for the aggregated textual content relating to the content item, and the embedding vectors of the keywords. Thereafter, the routine 300 terminates.

Returning again to routine 200 of FIG. 2, after having generated the content item signals for the posted content item, at block 208 the hyperlinked landing page for the content item is identified. At block 210, the landing page is accessed and, at block 212, a plurality of landing page signals is generated from the landing page, corresponding to those generated for the posted content item. Generating landing page signals for a content item's landing page is set forth below in regard to routine 350 of FIG. 3B.

Figure 3B:
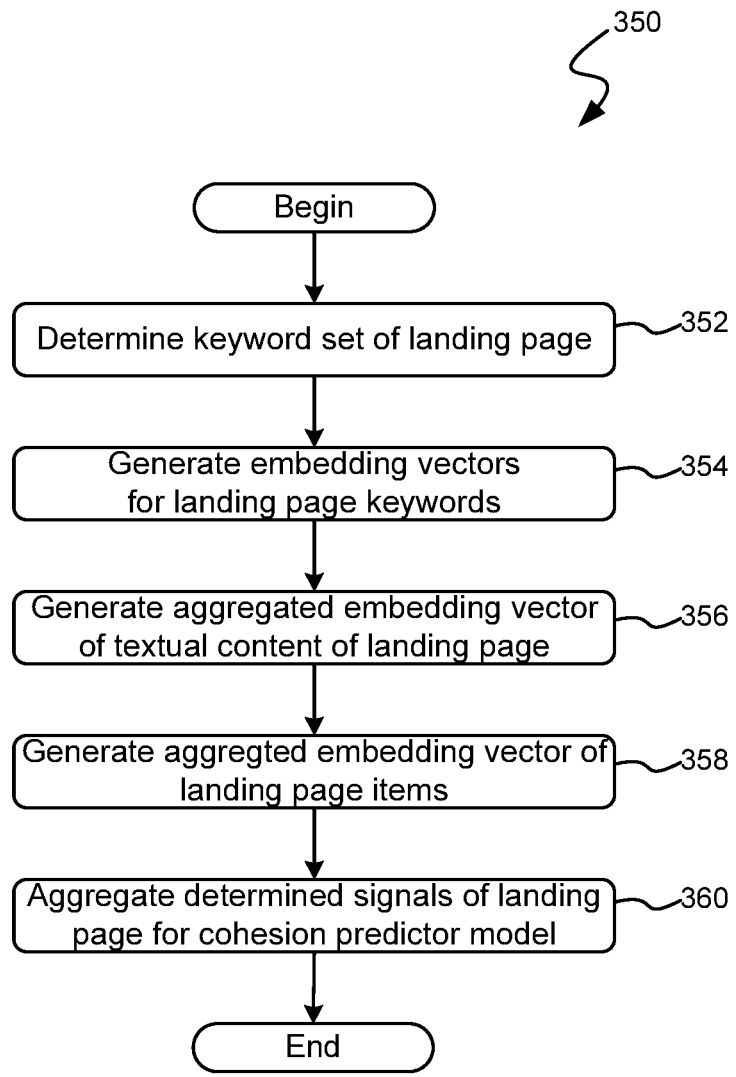

Turning to FIG. 3B, this figure is a flow diagram illustrating an exemplary routine 350 suitable for generating landing page signals for the hyperlinked landing page of a posted content item. Beginning at block 352, keywords associated with the landing page are identified. According to aspects of the disclosed subject matter, these keywords are taken from an aggregation of textual data associated with the landing item. These include, by way of illustration and not limitation, one or more titles within the landing page, one or more captions related to items within the landing page, user-supplied comments associated with one or more items of the landing page, the source URLs (uniform resource locator) of items in the landing page, and the like. With reference to landing page 122 of FIG. 1A, the landing page 122 includes several textual content items that include, by way of illustration and not limitation, text data 124-128 of the various content items, the source uniform resource locators (URL) of the content items of the landing page, and the like. From this aggregated text content, the keywords of the landing page are identified. According to aspects of the disclosed subject matter, this identification is made through an analysis of the aggregated textual content, resulting in the identification of a set of keywords (or key-phrases) for the landing page. In one embodiment, a TF/IDF (term frequency/inverse document frequency) analysis/evaluation is made to identify the keywords and key-phrases of the textual content.

At block 354, an embedding vector is generated for each of the identified keywords of the landing page. As discussed above in regard to block 304 of routine 300, these embedding vectors may be generated according to one or more private and/or public embedding vectors, such as FastText and ConceptNet.

At block 356, an aggregated embedding vector for the landing page is generated. As discussed above and according to some aspects and embodiments of the disclosed subject matter, an aggregated embedding vector of the textual content associated with the landing page comprises generating a hierarchical arrangement/organization of the various embedding vectors of the identified keywords. Alternatively and according to alternative aspects of the disclosed subject matter, generating the aggregated embedding vector of the landing page comprises averaging of the embedding vectors of the keywords associated with the landing page. As above (in regard to the content item) the averaging may include or factor in weighting values that may be associated with any or all of the keywords of the landing page.

At block 358, an aggregated embedding vector for the content items of the landing page is generated. As with the aggregated embedding vector of the text content, this aggregated embedding vector for the content items of the landing page may be generated as an average of embedding vectors of the various content items of the landing page. At block 360, the determined signals (i.e., the aggregated embedding vector of textual content and the aggregated embedding vector of the landing page items) are aggregated as signals of the landing page, corresponding to the signals of the content item as discussed in routine 300. Thereafter, routine 350 terminates.

Returning to routine 200 of FIG. 2, at block 214, based on an analysis of the content item signals and the landing page signals, a cohesive score is determined. This cohesive score is a combination of measurements or comparisons between the embedding vectors and similarities between the keyword/key-phrase sets. Various comparison heuristics may be used as well as weightings for specific comparisons, all resulting in a cohesive score indicating the topical cohesion between the posted content item and the hyperlinked landing page. By way of illustration, in comparing an embedding vector of the content item to an aggregated embedding vector of items in the landing page, a cosine similarity function may be employed resulting in an indication or measurement as to the similarity of one to the other. In addition to, or as an alternative to static weightings, a non-linear weighting may be applied to this measurement (and/or any other comparison or measurement) such that the closer the two items of content are, the more weight afforded to this measurement. Cosine similarity measurements may be made on the embedding vectors of the textual content of the content item and landing page. The measurements of similarity between keywords, aggregated text content, and content items may be normalized and combined to generate the overall topic cohesion score.

At decision block 216, a determination is made as to whether the predicted cohesive score falls below a predetermined threshold. If the cohesive score falls below the predetermined threshold (indicating a less-than required level of topic cohesion), at block 218 remedial action is taken with regard to the hyperlink associated with the posted content item. Remedial actions, or remediating, may include, by way of illustration and not limitation, disassociating the hyperlink with the posted content item, redirecting the hyperlink to a location that is known to the hosting service as providing relevant and acceptable content to the posted content item, associating a warning with the hyperlink such that a party, upon initial activation of the hyperlink, will be warned that content at the linked content (landing page) might not be relevant to the posted content and/or suitable for viewing. Thereafter, the routine 200 returns to block 202 for the next periodic iteration of determining topic cohesion between the posted content item and the hyperlinked landing page.

Returning again to decision block 216, if the determination is made that the cohesion score meets or exceeds the predetermined threshold, the routine 200 proceeds to decision block 220. At decision block 220, a determination is made as to whether the cohesion score meets or exceeds a second threshold, referred to here as a utilization threshold. Meeting or exceeding this second, utilization threshold is indicative of a strong relationship between the posted content item and its landing page such that the online service hosting the posted content item could, potentially, advantageously utilize. Indeed, if the cohesion score meets or exceeds this utilization threshold, at block 222, the posted content item is optionally promoted and/or utilized.

Promoting or utilizing a posted content may include, by way of illustration and not limitation: promoting the posted content to users of the online service other than the posting user; posting advertisements with a presentation of the posted content to users of the online service; associating the posted content with keywords for presentation to other users; utilizing the posted content to drive engagement of other users with the online service; associating the posted content item with keywords and key-terms as an example of the keywords/key-terms; and the like. Utilization may further or alternatively include associating the cohesion score with the content item for use in other circumstances, including by recommender services in recommending or promoting content to users. By way of definition, a recommender service is a service that can be used to recommend or promote content (content that has not been specifically requested) to a user. In this circumstance, a recommender service could utilize cohesions scores of two items, among other signals, to differentiate which of the two items should be recommended/presented to a user. More particularly, a recommender service could ultimately choose between two items to recommend one to a user based on the recommended item having a higher page cohesion score.

After promoting and/or utilizing the posted content, or on the condition that the cohesions score fails to meet or exceed the utilization threshold, the routine 200 returns to block 202 to await the next periodic iteration of determining topic cohesion between the posted content item and the hyperlinked landing page.

Regarding routine 200, while this routine is described as a recurring, periodic routine to check the topical cohesiveness between a posted content item and a hyperlinked landing page, it should be appreciated that the substantive elements of routine 200 may be implemented as an on-demand routine that is executed as needed to determine the topical cohesiveness between any given content item and a corresponding landing page. Indeed, this on-demand version may be executed at the time that a party posts linked content to the posting service, thereby ensuring that all content (even at its first posting) has topical cohesiveness with a hyperlinked landing page.

While routine 200 presents identifying content item signals and corresponding landing page signals, and comparing the two sets of signals according to heuristics and weightings to determine a topic cohesion score, it should be appreciated that an alternative manner for determining a topic cohesion score may be implemented using machine learning techniques. Indeed, this machine learning manner is described in regard to FIG. 4.

Figure 4:
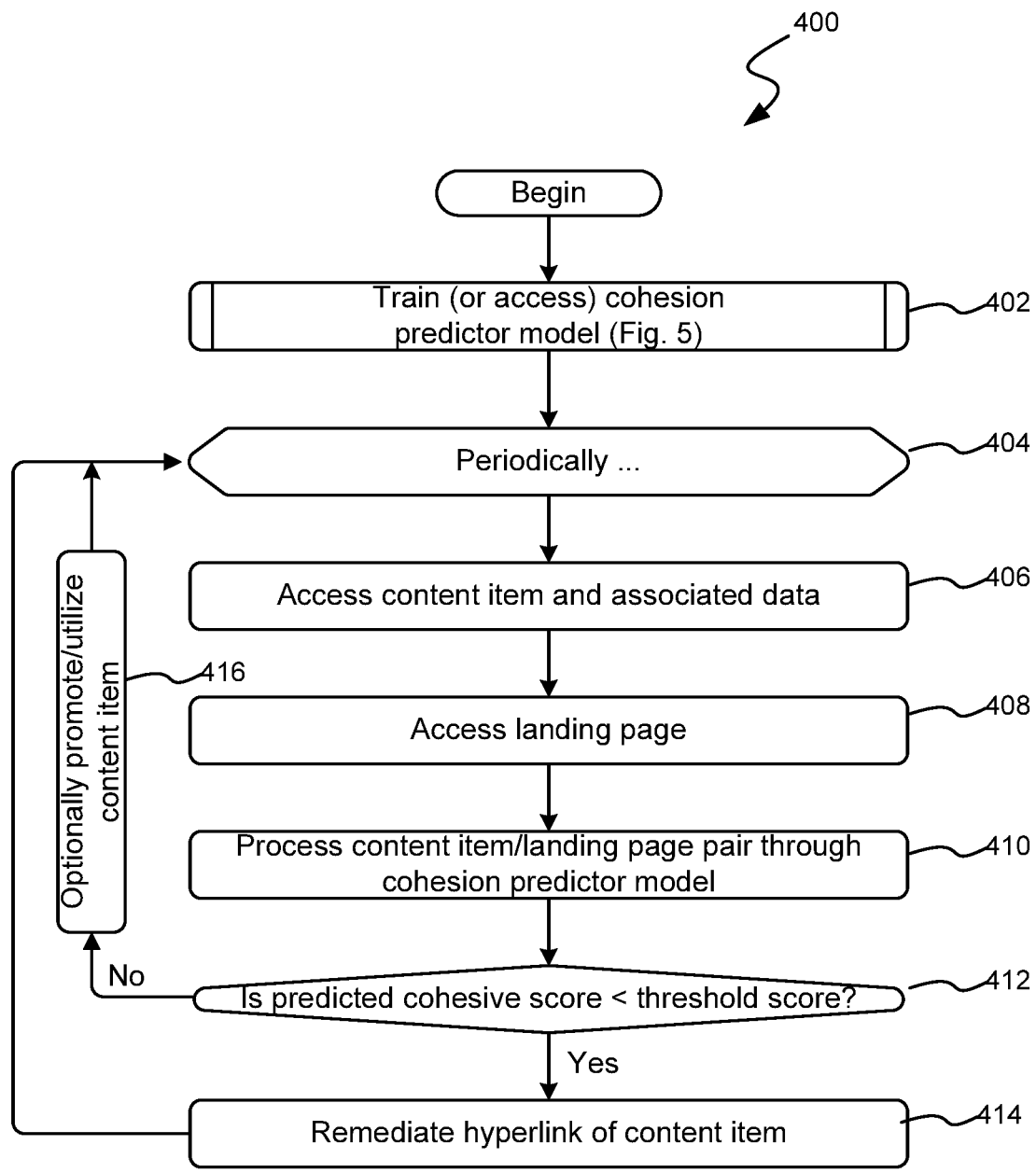
FIG. 4 is a flow diagram illustrating an alternative, exemplary routine for determining topic cohesion between a content item that is hyperlinked to a landing page, formed in accordance with aspects of the disclosed subject matter.

Turning to FIG. 4, this figure is a flow diagram illustrating an alternative, exemplary routine 400 for determining topic cohesion between a posted content item that is hyperlinked to a landing page, formed in accordance with aspects of the disclosed subject matter. Moreover, routine 400 is shown in FIG. 4 as a periodic routine for checking topic cohesion between a posted content item and its hyperlinked landing page, similar to that of routine 200 of FIG. 2. Further, routine 400 can be also suitably implemented as an on-demand routine for determining the topic cohesion between a posted content item and a hyperlinked landing page.

Beginning at block 402, a machine learning model is trained to score topic cohesion between a posted content item and a corresponding landing page. Of course, those skilled in the art will appreciate that training a machine learning model is not necessary. In any event, training a machine learning model to determine a topic cohesion score between a posted content item and a hyperlinked landing page is set forth in regard to routine 500 of FIG. 5.

Figure 5:
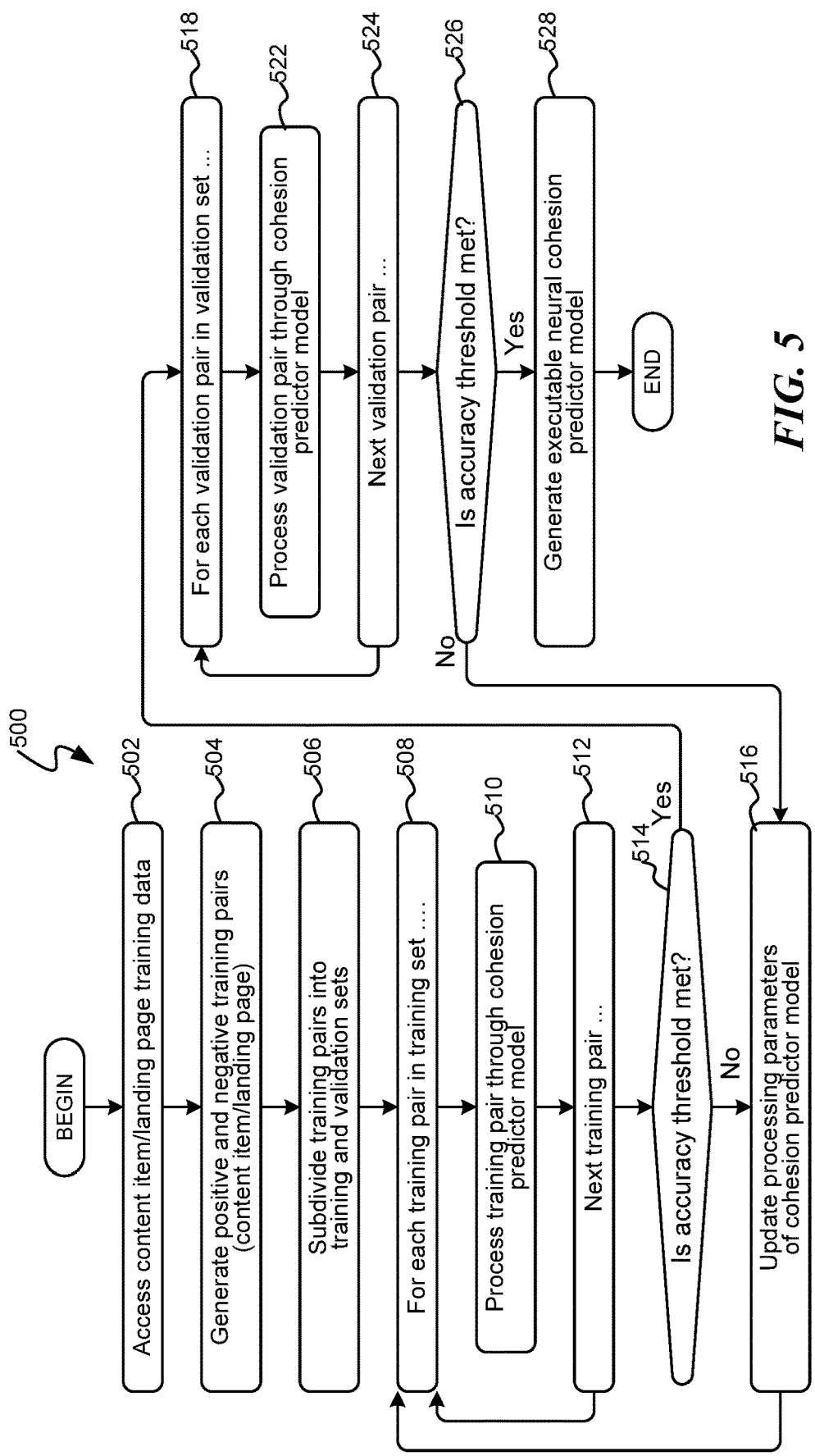
FIG. 5 is a flow diagram illustrating an exemplary routine for training a machine learning model to determine topic cohesion between a content item that is hyperlinked to a landing page, formed in accordance with aspects of the disclosed subject matter.

Turning to FIG. 5, this figure is a flow diagram illustrating an exemplary routine 500 for training a machine learning model to determine a topic cohesion score between a content item that is hyperlinked to a landing page, formed in accordance with aspects of the disclosed subject matter. Beginning at block 502, a corpus of content item/landing page training data is accessed. This training data includes training pairs (of content item and hyperlinked landing page) with a curated topic cohesion score indicating the topical cohesion between the pairs. At block 504, both positive and negative training pairs are generated, wherein the positive training pairs include posted content items and corresponding landing pages whose topic cohesion meets or exceeds a predetermined threshold, and where the negative training pairs include posted content items and corresponding landing pages whose topic cohesion does not meet the requisite threshold score.

At block 506, the training pairs are subdivided into training and validation sets, such that the machine learning model is trained on the training set and subsequently validated on the validation set, as set forth below.

At block 508, an iteration loop is begun to iterate through the training pairs of the training set. At block 510, a current training pair is processed through a cohesion predictor model (the machine learning model) and the predicted score for the current pair is saved. At block 512, if there are more training pairs of the training set to process, the routine returns to block 508 for the next training pair.

After all training pairs have been processed, at decision block 514 an evaluation of the results is made to determine whether the accuracy threshold is met (i.e., the topic cohesion score meets or exceeds a predetermined threshold). If the accuracy threshold is not met, the routine 500 proceeds to block 516 where various processing parameters (e.g., weightings, hyperparameters, thresholds, and the like) are updated within various processing levels of the cohesion predictor model. Thereafter, routine 500 returns to block 508 to begin anew at processing the training pairs of the training set.

At decision block 514, if the analysis of the processed results determines that the cohesion predictor model has achieved a desired level of accuracy, the routine 500 proceeds to block 518 to validate the results. Indeed, at block 518 another iteration loop is begun, this time to iterate through the validation pairs of the validation set. Much like the prior iterations, at block 522 the currently iterated validation pair is processed by the cohesion predictor model and the predicted accuracy results are captured. At block 524, if there are additional validation pairs to process, the routine 500 returns to block 518 to process a next validation pair. Once all validation pairs have been processed, the routine 500 proceeds to decision block 526.

At decision block 526, an analysis of the results of the validation set is made to determine whether the accuracy threshold is met. If the accuracy threshold is not met, the routine proceeds to block 516 where various processing parameters (e.g., weightings, hyperparameters, thresholds, and the like) are updated within various processing levels of the cohesion predictor model. Thereafter, routine 500 returns to block 508 to again, begin the iteration process of processing the training pairs of the training set (with the updated processing parameters.) In the alternative, if at decision block 526 the accuracy threshold has been achieved, the routine 500 proceeds to block 528.

At block 528, with the cohesion predictor model now trained to predict a topic cohesion score for a content item/hyperlinked landing page pair with a desired level of accuracy, an executable version of the now-trained cohesion predictor model is generated. As those skilled in the art will appreciate, an executable version of the cohesion predictor model is one that does not include the training/updating processes and/or data capture modules that enable a machine learning model to be "trained." Removing these features enhances performance in processing content item/landing page pairs.

After having trained the cohesion predictor model and generated an executable version, routine 500 terminates.

Returning to routine 400, after having trained the cohesion predictor model, at block 404 a looping is begun to periodically determine or check on the topic cohesion between a posted content item and a corresponding landing page. At block 406, the posted content item (and associated data of the content item) is accessed. At block 408, the hyperlinked landing page is accessed. At block 410, the content item and the landing page are provided to the executable cohesion predictor model that returns a predicted topic cohesion score.

At decision block 412, a determination is made as to whether the predicted topic cohesion score meets or exceeds a predetermined threshold. If the predicted topic cohesion score falls below the predetermined threshold, the routine 400 proceeds to block 414. At block 414, remedial action is taken with regard to the hyperlink from the posted content item to the landing page. As indicated above, remedial action, or remediating, may include, by way of illustration and not limitation, disassociating the hyperlink with the posted content item, redirecting the hyperlink to a location that is known to the hosting service as providing relevant and acceptable content to the posted content item, associating a warning with the hyperlink such that a party, upon initial activation of the hyperlink, will be warned that content at the linked content (landing page) might not be relevant to the posted content and/or suitable for viewing.

As an alternative in the event that predicted topic cohesion score at least meets the predetermined threshold, or meets and alternative second predetermined threshold, indicative of a high cohesion between the content item and its landing page, at block 416 the content item could be advantageously used in promotion to others, or advantageously leveraged and/or utilized to increase advertising margins relating to the content item. This promotion may include, by way of illustration and not limitation, presenting the content item to other users of the online service, associating advertisements with the content item, and the like.

As discussed above, in addition to promoting and/or utilizing the cohesion score at the time it is generated, the cohesion score may be associated with the content item for subsequence utilization. The utilizations may include, by way of illustration and not limitation, utilizing the cohesion score in recommending or promoting content to users at some later time. More particularly, while recommending content, the cohesions scores of two items may be considered, along with other signals, to differentiate which of two or more items should be recommended/presented to a user, choosing one item over others based on the selected/chosen item having a higher page cohesion score.

After taking remedial action or, if the predicted topic cohesion score at least meets the predetermined threshold, the routine 400 returns to block 404 to await a next period for checking on the topic cohesion between the posted content item and the hyperlinked landing page.

As with routine 200, while this routine 400 is described as a recurring, periodic routine to check the topical cohesiveness between a posted content item and a hyperlinked landing page, it should be appreciated that the substantive elements of routine 400 may be implemented as an on-demand routine that is executed as needed to determine the topical cohesiveness between any given content item and a corresponding landing page. Indeed, this on-demand version may be executed at the time that a party posts linked content to the posting service, thereby ensuring that all content (even at its first posting) has topical cohesiveness with a hyperlinked landing page.

Figure 6:
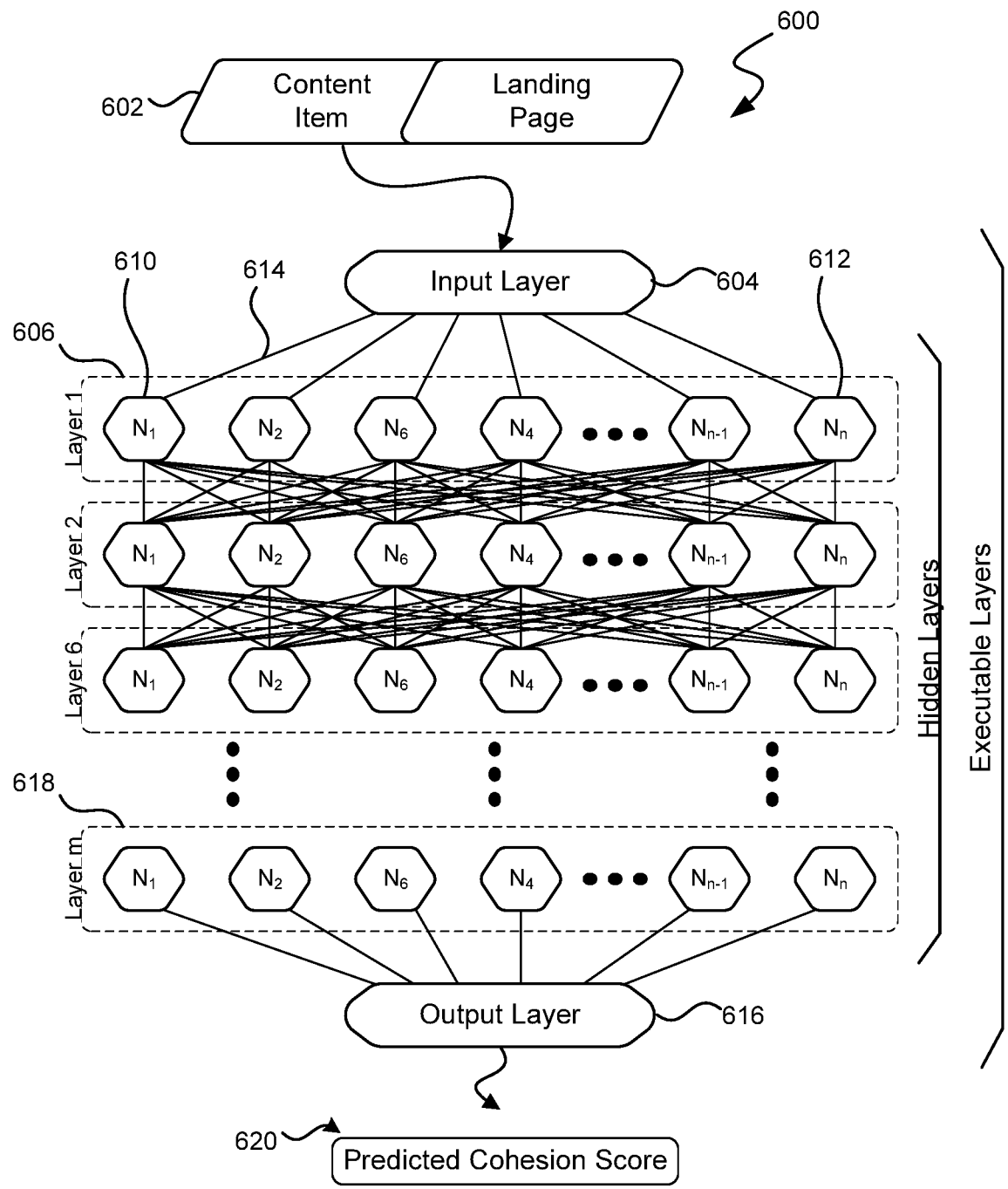
FIG. 6 is a block diagram illustrating exemplary components of a machine learning model or neural network which can be suitably trained to determine topic cohesion between a content item that is hyperlinked to a landing page in accordance with aspects of the disclosed subject matter.

Turning to FIG. 6, this figure is a block diagram illustrating exemplary components of a machine learning model 600 or neural network which can be suitably trained to determine topic cohesion between a content item that is hyperlinked to a landing page in accordance with aspects of the disclosed subject matter.

FIG. 5 is a flow diagram illustrating elements of a machine learning model 600 (sometimes also referred to as a neural network) suitable for training as a cohesion predictor model, in accordance with aspects of the disclosed subject matter.

As those skilled in the art will appreciate, a machine learning model 600 comprises multiple executable layers, including an input layer 604, an output layer 616, and one or more hidden layers. By way of illustration, the exemplary machine learning model 600 includes m hidden layers, including hidden layers 606 and 618. The input layer 604 accepts the input data (e.g., a posted content item/landing page pair 602) for which the machine learning model 600 predicts a likely cohesion score.

The input layer 604 accepts the input data, in this illustrated instance the posted content item/landing page pair 602, textual content that may be associated with the posted content item and, according to one or more predetermined algorithms and/or heuristics embedding within the various layers, generates a likely, predicted cohesion score indicative of the topic cohesion between the posted content item and the hyperlinked landing page. These values, not shown in FIG. 6 but implied by the various edges, such as edge 614, extending from the input layer 604 to the various processing nodes of the first hidden layer 606, constitute at least some of the output of the input layer and are distributed as input data or input values to processing nodes of the first hidden layer 606 of the machine learning model 600, such as processing nodes 610 and 612.

Typically, though not exclusively, a value or facet of the input data passed from the input layer 604 to a first processing node in the first hidden layer, such as node 610 of hidden layer 606, is different than a value/facet passed to a second processing node of that same hidden layer, such as to node 612 of hidden layer 606.

Each hidden layer, including hidden layers 606 and 618, comprises a plurality of processing or convolutional nodes. By way of illustration and not limitation, hidden layer 606 includes n processing nodes, N. While the processing nodes of the first hidden layer 606 typically, though not exclusively, have a single input value from the input layer 604, processing nodes of subsequent hidden layers typically have input values from one or more processing nodes of the previous input layer. Of course, in various embodiments the processing nodes of the first hidden layer 606 may receive, as input values, all output values of the input layer 604.

In various embodiments and as illustrated in the executable neural network 600, each hidden layer (except for the first hidden layer 606) accepts input data/signals from each processing node of the prior hidden layer, as indicated by the edges proceeding from a processing node of an "upper" hidden layer (e.g., layer 606) to a "lower" hidden layer. Of course, alternative embodiments need not include such wide distribution of output values to the processing nodes of a subsequent, lower level.

Each processing node implements one or more "convolutions," "computations" or "transformations" on the input data it receives (whether the processing node receives a single item of input data, or plural items of input data) to produce a single output value. These convolutions, projections, and/or transformations may include any number of functions or operations to generate the output data such as, by way of illustration and not limitation, data aggregations, clustering various input values, transformations of input values, combination of plural input values, selections and/or filters among input values, mathematical manipulations of one or more input values, linear and/or multivariate regressions of the input values, statistical determinations of the input values, predictive evaluations, and the like. Moreover, individual items of input data may be weighted in any given processing node such that the weighted input data plays a greater or lesser role in the overall computation for that processing node. Items of input data may be weighted in such a manner as to be ignored in the various convolution and computations. Hyperparameters (data/values that are input from sources external to processing nodes of a prior input level) may also be utilized by all or some of the processing nodes of a hidden layer.

As will be appreciated by those skilled in the art, one of the interesting aspects of training machine learning models is that the various executable levels are adaptable to accommodate self-learning. In other words, when provided feedback, modifications may be made to the weights, parameters, and processing or convolutional operations of the processing nodes in the various layers, in order to achieve better results. Due to this adaptability, except for initially established computations of the various processing nodes in a training phase of the machine learning process, a person is unlikely to have specific insight or knowledge as to the exact nature of output values and, correspondingly, the exact nature of convolutions and/or computations that any particular processing node of a hidden layer may utilize. Instead, during the training process of a machine learning model, the machine learning model adaptively makes its own determinations as to how to modify each computation, convolution or transformation of a given processing node to produce better and/or superior results from the input values it receives.

At the final hidden layer, e.g., layer 618, the processing nodes provide their output data to the output layer 616. The output layer 616 performs whatever final aggregations, calculations, transformations, projections, normalizations and/or interpretations of the various items of input data to produce a predicted topic cohesion score 620 for the input pair 602.

Regarding routines 200, 300, 350, 400 and 500 described above, as well as other routines and/or processes described or suggested herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted.

Optimizations of routines may be carried out by those skilled in the art without modification of the logical process of these routines and processes. Those skilled in the art will recognize that the logical presentation of steps is sufficiently instructive to carry out aspects of the claimed subject matter irrespective of any specific development or coding language in which the logical instructions/steps are encoded. Additionally, while some of these routines and processes may be expressed in the context of recursive routines, those skilled in the art will appreciate that such recursive routines may be readily implemented as non-recursive calls without actual modification of the functionality or result of the logical processing. Accordingly, the particular use of programming and/or implementation techniques and tools to implement a specific functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing system described in FIG. 8 below. Additionally, in various embodiments all or some of the various routines may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single or narrow purposed applications), and/or methods, these aspects may also be embodied as computer executable instructions stored by computer readable media, also referred to as computer readable storage media, which (for purposes of this disclosure) are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 7:
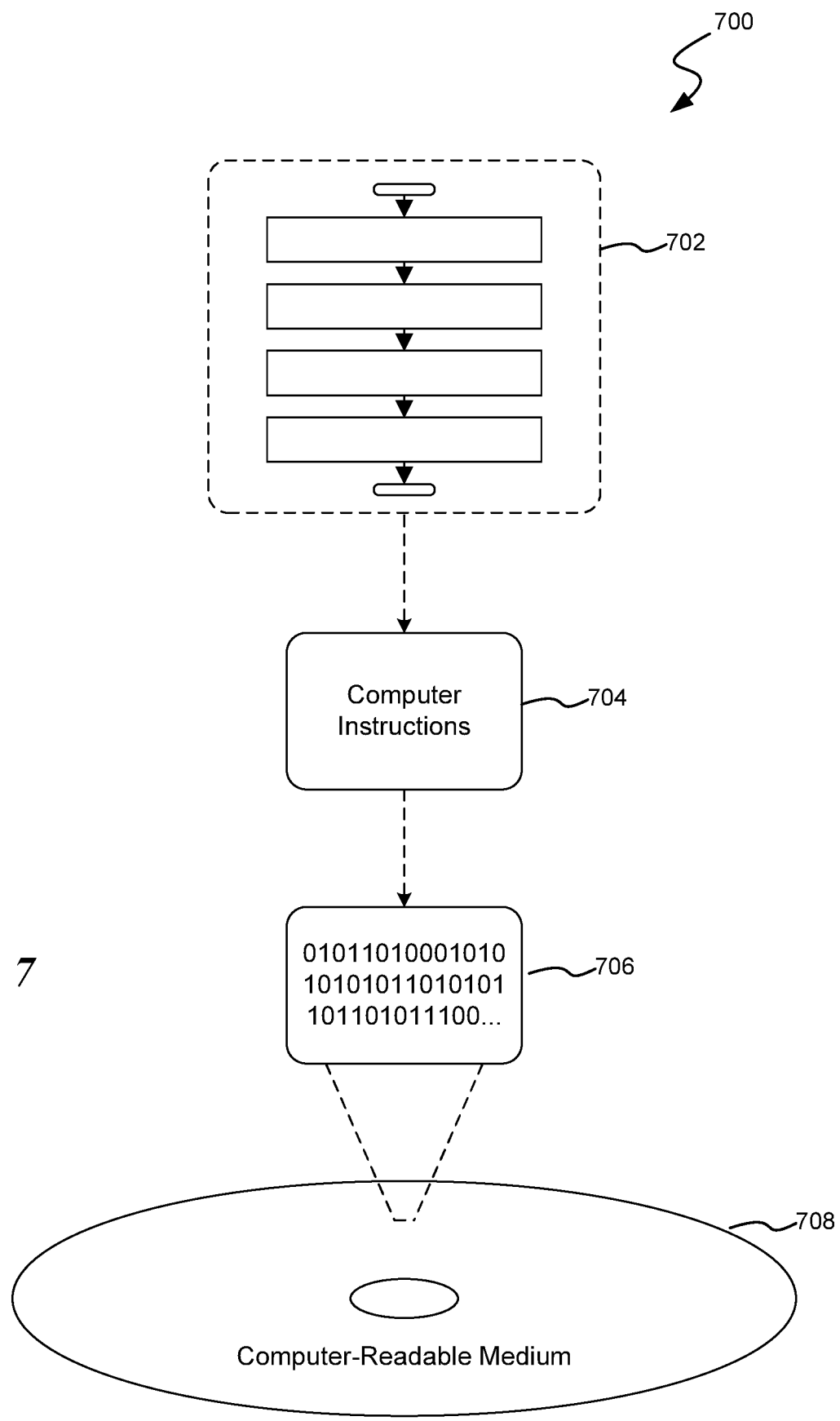
FIG. 7 is a block diagram illustrating an exemplary computer-readable medium bearing instructions for determining topic cohesion between a posted content item and a corresponding hyperlinked landing page, formed in accordance with aspects of the disclosed subject matter.

Regarding computer readable media, FIG. 7 is a block diagram illustrating an exemplary computer-readable medium bearing instructions for determining topic cohesion between a posted content item and a hyperlinked landing page, formed in accordance with aspects of the disclosed subject matter. More particularly, the implementation 700 comprises a computer-readable medium 708 (e.g., a CD-R, DVD-R or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of exemplary routines 200-500, for example. In another such embodiment, the processor-executable instructions 704 may be configured to implement a system on a computing device, such as at least some of the exemplary, executable components of computing device 800 of FIG. 8, as described below. Many such computer readable media may be devised, by those of ordinary skill in the art, which are configured to operate in accordance with the techniques presented herein.

Figure 8:
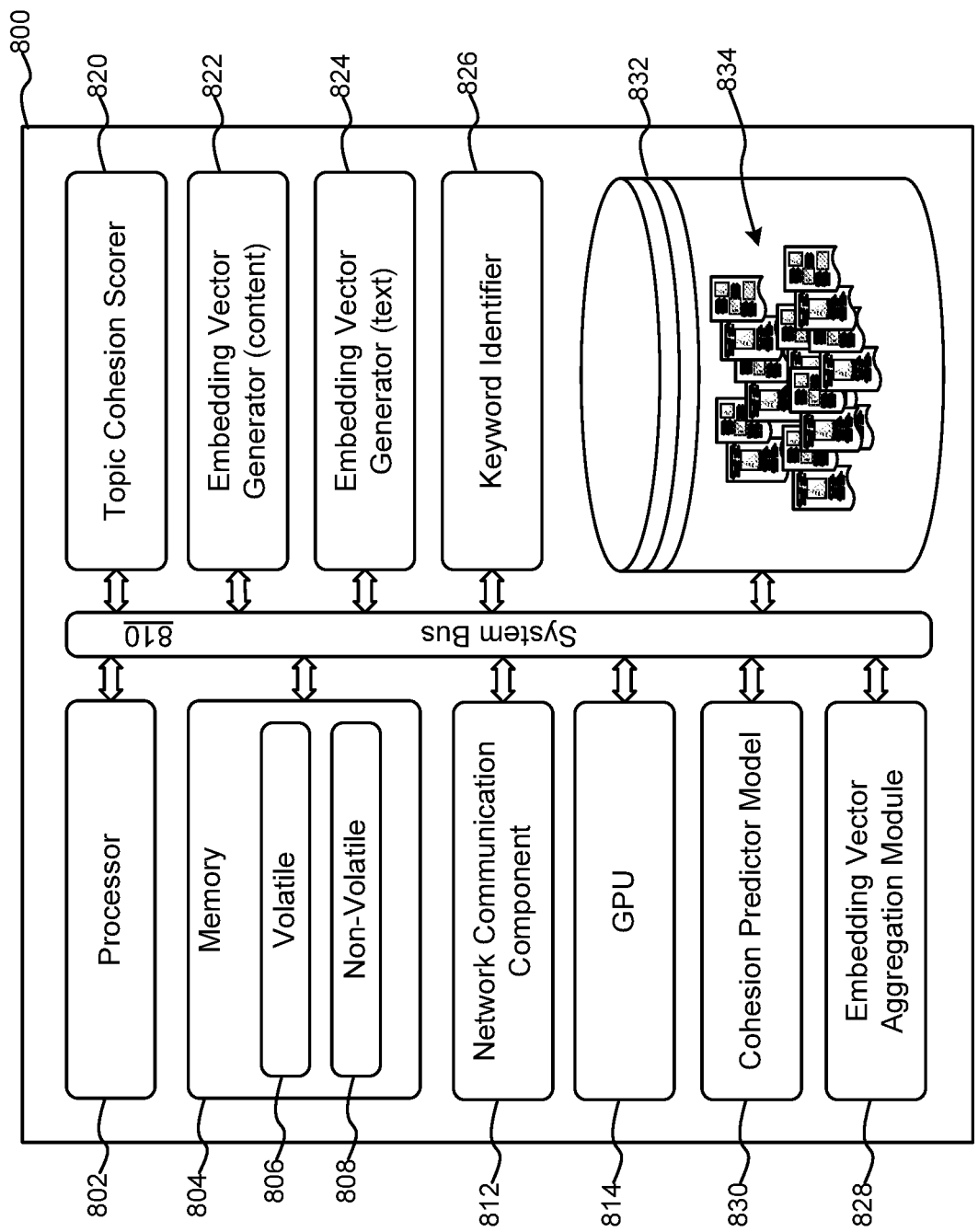
FIG. 8 is a block diagram illustrating exemplary components of a computer system configured to implement a service for determining topic cohesion between a content item that is hyperlinked to a landing page, formed in accordance with aspects of the disclosed subject matter.

Turning to FIG. 8, FIG. 8 is a block diagram illustrating exemplary components of a computer system configured to implement a service for determining topic cohesion between a content item that is hyperlinked to a landing page, formed in accordance with aspects of the disclosed subject matter. The computing system 800 typically includes one or more central processing units (or CPUs), such as CPU 802, and further includes at least one memory 804. The CPU 802 and memory 804, as well as other components of the computing system, are interconnected by way of a system bus 810.

As will be appreciated by those skilled in the art, the memory 804 typically (but not always) comprises both volatile memory 806 and non-volatile memory 808. Volatile memory 806 retains or stores information so long as the memory is supplied with power. In contrast, non-volatile memory 808 is capable of storing (or persisting) information even when a power supply is not available. In general, RAM and CPU cache memory are examples of volatile memory 806 whereas ROM, solid-state memory devices, memory storage devices, and/or memory cards are examples of non-volatile memory 808.

As will be further appreciated by those skilled in the art, the CPU 802 executes instructions retrieved from the memory 804, from computer readable media, such as computer readable media 708 of FIG. 7, and/or other executable components in carrying out the various functions of the disclosed subject matter. The CPU 802 may be comprised of any of a number of available processors such as single-processor, multi-processor, single-core units, and multi-core units, which are well known in the art.

Further still, the illustrated computing system 800 typically also includes a network communication interface 812 for interconnecting this computing system with other devices, computers and/or services over a computer network, such as network 130 of FIGS. 1A and 1B. The network communication interface 812, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 812, is typically comprised of hardware and/or firmware components (and may also include or comprise executable software components) that transmit and receive digital and/or analog signals over a transmission medium (i.e., the network 130).

The illustrated computing system 800 also includes a graphics processing unit (GPU) 814. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied to training machine learning models and/or neural networks that manipulate large amounts of data. Indeed, one or more GPUs, such as GPU 814, are often viewed as essential processing components when conducting machine learning techniques. Also, and according to various embodiments, while GPUs are often included in computing systems and available for processing convolutions of machine learning models, such as GPU 814 of computing system 800, multiple GPUs are also often deployed as online GPU services or farms and machine learning processing are advantageously directed to conducting the various layers/convolutions of training a neural network.

The computing system 800 further includes a system-executable topic cohesion scorer 820. In execution, the topic cohesion scorer 820 is configured to aggregate posted content item signals and corresponding landing page signals and determine a topic cohesion score for the pair as described above in regard to block 214 of routine 200. These signals may be generated according to various components including an embedding vector generator 822 (for non-textual content items), and an embedding vector generator 824 (for textual content), keyword identifier 826 to generate or identify keywords for content items and landing pages as discussed above in regard to routines 300 and 350, and an embedding vector aggregation module 828 that aggregate plural embedding vectors (of the same type) that may further factor in weighting values associated with the various embedding vectors. These various components operate on any one or more of posted content items within posted pages of a corpus of content 834 maintained in a data store 832. The topic cohesion scorer 820 may further rely upon a cohesion predictor model to obtain a predicted score of cohesion based on the aggregated signals of both the user-posted content item and the corresponding landing page.

Alternatively, or in addition to, the executable components 820-828, the computing system 800 further includes a system-executable cohesion predictor model 830. As discussed above in regard to routine 400, the cohesion predictor model 828 is a trained machine learning model (trained in a manner described above in regard to routine 500) that operates on any one or more of posted content items within posted pages of the corpus of content 834.

Regarding the various components of the exemplary computing device 800, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method, comprising:
identifying a content item included on a posting page;
determining that the content item is linked to a landing page;
generating, for the content item, at least one content item signal representative of the content item;
generating, for the landing page, at least one landing page signal representative of the landing page;
determining, based at least in part on the at least one content item signal and the at least one landing page signal, a topic cohesion score between the content item and the landing page; determining that the topic cohesion score exceeds a threshold value; and
based at least in part on the determination that the topic cohesion score exceeds the threshold value, promoting the content item.

2. The computer-implemented method of claim 1, wherein generating the at least one content item signal includes:
generating a content item textual context embedding vector representative of a textual context associated with the content item;
generating a content item embedding vector representative of the content item; and
aggregating the content item textual context embedding vector and the content item embedding vector.

3. The computer-implemented method of claim 2, wherein generating the content item textual context embedding vector includes:
identifying a plurality of keywords associated with the content item;

generating a keyword embedding vector for each of the plurality of keywords; and
aggregating the keyword embedding vectors to generate the content item textual context embedding vector.

4. The computer-implemented method of claim 1, wherein generating at least one landing page signal includes:
generating a landing page textual context embedding vector representative of a textual context associated with the landing page;
generating a landing page content item embedding vector representative of at least one second content item included on the landing page; and
aggregating the landing page textual context embedding vector and the landing page content item embedding vector.

5. The computer-implemented method of claim 4, wherein generating the landing page textual context embedding vector includes:
identifying a plurality of keywords associated with the landing page;
generating a keyword embedding vector for each of the plurality of keywords; and
aggregating the keyword embedding vectors to generate the landing page textual context embedding vector.

6. A computer system, comprising:
one or more processors; and
a memory storing program instructions that, when executed by the one or more processors, cause the one or more processors to at least:
identify a content item included on a posting page;
determine that the content item is linked via a link to a landing page;
generate, for the content item, a content item embedding vector representative of the content item;
generate, for the landing page, a landing page embedding vector representative of the landing page;
determine, based at least in part on the content item embedding vector and the landing page embedding vector, a topic cohesion score between the content item and the landing page;
determine that the topic cohesion score exceeds a threshold value; and
based at least in part on the determination that the topic cohesion score exceeds the threshold value, promote the content item to a user of an online service.

7. The computing system of claim 6, wherein the topic cohesion score is determined by a trained machine learning model.

8. The computing system of claim 6, wherein determining the topic cohesion score includes:
determining a cosine similarity measure between the content item embedding vector and the landing page embedding vector.

9. The computing system of claim 6, wherein the program instructions include further instructions that, when executed by the one or more processors, further cause the one or more processors to at least:
associate the cohesion score with the content item;
obtain a second content item, the second content item being associated with a second cohesion score; and
select, based at least in part on the cohesion score and the second cohesion score, one of the content item or the second content item to be provided to a second user.

10. The computing system of claim 6, wherein generating the content item embedding vector includes:

generating a content item textual context embedding vector representative of a textual context associated with the content item;
generating a non-textual content item embedding vector representative of the content item; and
aggregating the content item textual context embedding vector and the non-textual content item embedding vector to generate the content item embedding vector.

11. The computing system of claim 10, wherein generating the content item textual context embedding vector includes:
identifying a plurality of keywords identified according to a term frequency/inverse document frequency (TF/IDF) analysis of the textual content associated with the content item;
generating a plurality of keyword embedding vectors representative of the plurality of identified keywords; and
aggregating the plurality of keyword embedding vectors to generate the content item textual content embedding vector.

12. The computing system of claim 11, wherein aggregating the plurality of keyword embedding vectors includes:
assigning a weight to at least one of the plurality of keyword embedding vectors; and
averaging the plurality of keyword embedding vectors.

13. The computing system of claim 6, wherein generating the landing page embedding vector includes:
generating a landing page textual context embedding vector representative of a textual context associated with the landing page;
generating a landing page content item embedding vector representative of at least one second content item included on the landing page; and
aggregating the landing page textual context embedding vector and the landing page content item embedding vector to generate the landing page embedding vector.

14. The computing system of claim 6, wherein the program instructions include further instructions that, when executed by the one or more processors, further cause the one or more processors to at least:
generate, for the content item, a second content item embedding vector representative of the content item;
generate, for the landing page, a second landing page embedding vector representative of the landing page;
determine, based at least in part on the second content item embedding vector and the second landing page embedding vector, a second topic cohesion score between the content item and the landing page;
determine that the second topic cohesion score is less than a second threshold value; and
based at least in part on the determination that the second topic cohesion score is less than the second threshold value, remediate the link between the content item and the landing page.

15. The computing system of claim 14, wherein remediating the link includes at least one of:
deleting the link between the content item and the landing page;
linking the content item to a second landing page; or
associating a warning with the link indicating that the landing page is no longer relevant to the content item.

16. A computer-implemented method, comprising:
identifying a content item included on a posting page;
determining that the content item is linked to a landing page via a hyperlink;

generating, for the content item, at least one content item signal representative of the content item;

generating, for the landing page, at least one landing page signal representative of the landing page;

determining, based at least in part on the at least one content item signal and the at least one landing page signal, a topic cohesion score between the content item and the landing page;

determining that the topic cohesion score exceeds a threshold value;

evaluating the topic cohesion score relative to the threshold value;

upon a first determination that the topic cohesion score is less than the threshold value, remediating the hyperlink of the content item to the landing page; and upon a second determination that the topic cohesion score exceeds the threshold value, promoting the content item.

17. The computer-implemented method of claim 16, wherein the at least one content item signal includes:

a content item textual context embedding vector representative of a textual context associated with the content item; and a non-textual content item embedding vector representative of the content item.

18. The computer-implemented method of claim 17, wherein the content item textual context embedding vector includes a weighted average of a plurality of keyword embedding vectors associated with one or more sets of keywords identified in the posting page.

19. The computer-implemented method of claim 16, wherein the at least one content item signal includes:

generating a content item textual context embedding vector representative of a textual context associated with the content item;

generating a non-textual content item embedding vector representative of the content item; and aggregating the content item textual context embedding vector and the non-textual content item embedding vector to generate the content item embedding vector.

20. The computer-implemented method of claim 16, further comprising:

applying one or more weights to the at least one content item signal to generate weighted content item signals;

applying one or more weights to the at least one landing page signal to generate weighted landing page signals; and wherein determining the topic cohesion score between the content item and the landing page is based at least in part on the weighted content item signals and the weighted landing page signals.

* * * * *